July 20, 1937.  R. S. WHITTINGTON  2,087,367
VACUUM BRAKE OPERATING DEVICE
Filed March 27, 1933

INVENTOR
Ralph S. Whittington
BY
ATTORNEY.

Patented July 20, 1937

2,087,367

UNITED STATES PATENT OFFICE 2,087,367

VACUUM BRAKE OPERATING DEVICE

Ralph S. Whittington, Oak Park, Ill., assignor to Bendix Products Corporation, South Bend, Ind., a corporation of Indiana Application March 27, 1933, Serial No. 662,946

16 Claims. (Cl. 188—152)

This invention relates to a method of operating the brakes of an automotive vehicle whereby manifold vacuum is used to assist the operator, and furnish a part of the energy required to make the brake application. One of the objects of this invention is to provide such a system, having the characteristic of using energy or vacuum from the manifold in proportion to the pressure the operator applies, on the conventional foot brake. A further object of this invention is to provide such a system with which the ratio of the energy applied by vacuum and by the operator can be controlled to a greater degree as the brakes are applied. Also this invention has the object of providing a vacuum brake operating means whereby at any desired degree of deceleration, the vacuum will automatically be prevented from applying the brakes to any greater degree.

With the vacuum brake operating devices of current design, some difficulty is experienced in that when the manual brake pedal is operated slightly too hard, the brake application becomes too severe. This is particularly apt to happen when the operator becomes excited and attempts to make a rapid stop. The resulting locking of the wheels of the vehicle often results in serious skidding. On wet or ice covered streets, this condition is almost sure to occur, particularly with a system which normally allows vacuum to do an appreciable amount of the work of applying the brakes.

To overcome the above difficulty, this invention provides an inertia operated cut-off valve that automatically cuts off the vacuum which operates the brakes at some predetermined degree of deceleration. Thus, when the operator applies the manual brake severely, the brake becomes a fully manual brake, after some predetermined degree of deceleration is attained. This invention also provides a means, controlled from the dash, of adjusting the point at which the inertia cut-off valve operates, to close off the vacuum from the system. Thus, the operator of the vehicle can adjust the inertia cut-off valve to meet any road conditions encountered. On slippery roads it is desirable to have this valve operate at a smaller degree of deceleration than on dry roads.

This invention also provides an inertia control valve which is balanced by the vacuum in the actuating member of the system so that the degree of deceleration imparted to the vehicle by the manual operation of the brakes, operates the inertia control valve to admit vacuum to the brake actuating member in proportion to the deceleration caused by the manual operation of the brakes. Thus vacuum assists in the brake application in proportion to the amount of pressure applied at the foot pedal and the proportionate part of the work done manually and by vacuum is controlled by the relation of the inertia forces and vacuum counter-balance of the control valve. The inertia control valve is also provided with adjustments to vary the relative effect of manual and vacuum operation of the brakes, as the brakes are applied.

Means are also provided of rendering the inertia valve inoperative while the manual brake pedal is completely released as will be further described.

Figure 1:
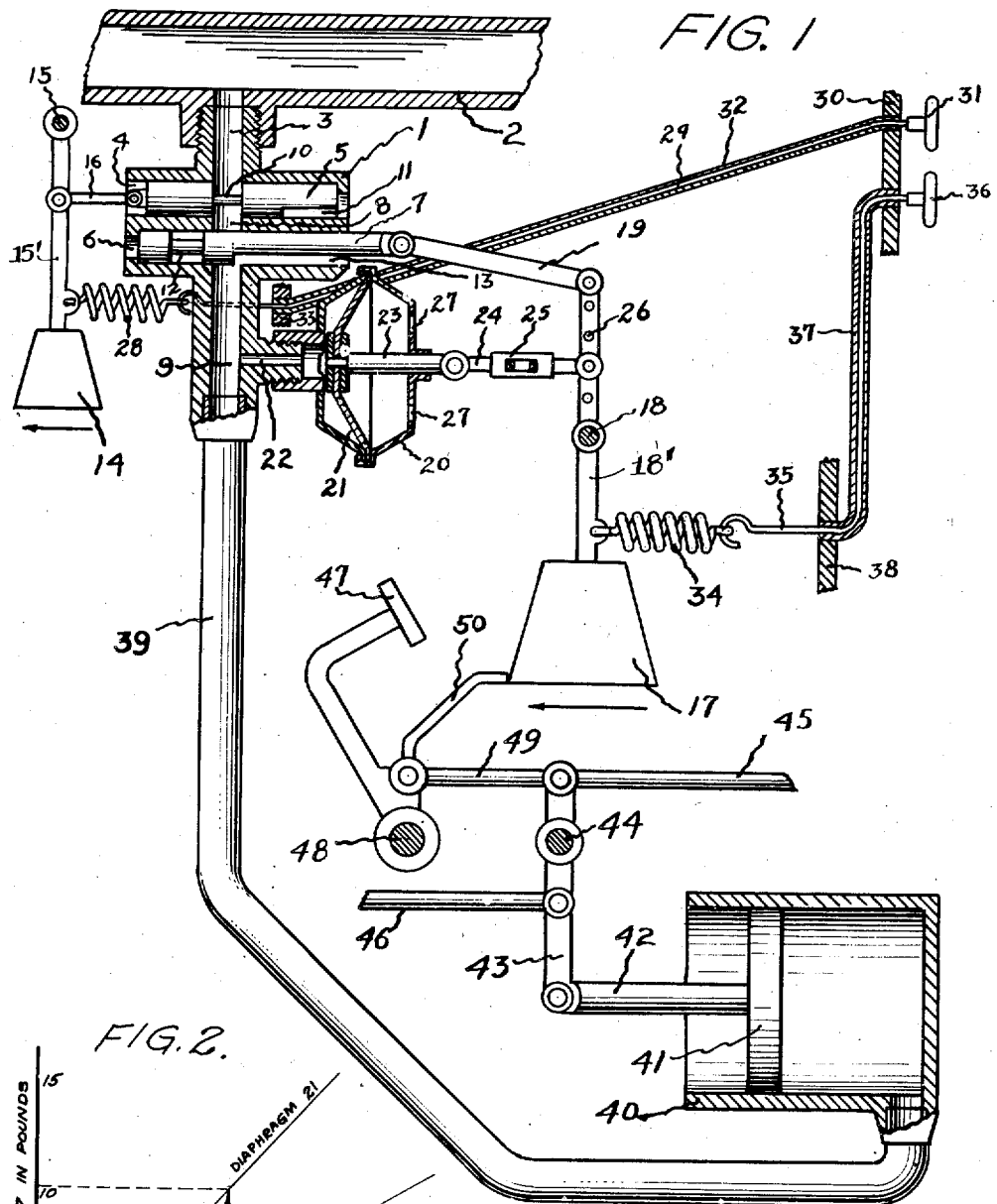
Figure 1 is a semi-diagrammatic view partly in section of a brake operating means constructed in accordance to this invention.

Referring then to the drawing, there is shown in Figure 1 a system in which the valve body I is tapped into some section of the intake manifold 2. The valve I provides the passage 3 which communicates with the interior of the intake manifold.

The traverse bore 4 is formed in valve body I and slidably receives the valve 5, and the bore 6 is similarly formed to receive the valve 7. Valve 5 controls communication between the passage 3 and the passage 8 by virtue of the reduced portion 10, and between passage 8 and the atmosphere by virtue of groove 11. Valve 7 controls communication between passage 8 and passage 9 by virtue of the reduced portion 12, and between passage 9 and the atmosphere by means of the groove 13.

The weight 14 is pivotably supported at the bearing 15 by lever 15', and connected to valve 5 by means of the rod 16 so that valve 5 responds to the motion of the weight 14. Likewise, weight 17 is pivotably supported by the bearing 18 and lever 18' and connected to the valve 7 by the rod 19 so that valve 7 responds to the motion of weight 17.

The diaphragm casing 20 containing the diaphragm 21 is tapped onto the valve body I and communicates with passage 9 through the passage 22. Diaphragm 21 is connected to the weight 17 by means of the rod 23 and the linkage 24 which contains the adjusting turn-buckle 25. The linkage 24 is adapted to be connected to the weight 17 at a series of points, as the point 26, above the supporting bearing 18. The holes 27 allow atmospheric pressure to act on diaphragm 21.

The spring 28 is further provided and operatively connected to weight 14. The opposite end of spring 28 is connected to the wire 29 which is controlled at the dash 30 by the button 31. The wire 29 is supported by the flexible cover 32 which is supported at the dash 30 and the support 33.

The spring 34 is operatively connected to the weight 17. To the opposite end of spring 34 is connected the wire 35 which is controlled at the dash 30 by the control button 36. The wire 35 is supported by the flexible cover 37 which is supported at the dash 30 and the support 38.

Into the valve body 1 is tapped the conduit 39 which forms a passage communicating with passage 9 and the interior of the power cylinder 40. The cylinder 40 slidably receives the piston 41 which by means of rod 42 is connected to the brake lever 43. Brake lever 43 is pivotably supported at the bearing 44 and carries the brake rod 45, adapted to operate the rear brakes of the vehicle, and the brake rod 46, adapted to operate the front brakes of the vehicle.

The manual brake pedal 47 is pivotably supported by the bearing 48, and operatively connected to the brake lever 43 by the linkage 49. Integral with the brake pedal 47 is the arm 50 which contacts the weight 17 while the pedal 47 is released.

In the operation of the system, intake manifold vacuum is always present in the passage 3, and valve 5 and weight 14 are in the position shown in Figure 1 unless the vehicle is made to decelerate. The forward motion of the vehicle is in the direction of the arrow under weight 14, and weight 14, due to its inertia swings in the direction of the arrow as the vehicle decelerates in response to the application of the brakes. The motion of weight 14 and valve 5 will depend on the tension of spring 28, the rate of deceleration of the vehicle, the mass of weight 14, and the length of the weight pendulum. However, these factors are to be related so that at some predetermined rate of deceleration the weight 14 will swing forward causing valve 5 to close passage 3 from passage 8. At a slightly greater rate of deceleration the weight 14 will swing forward enough to open passage 8 to the atmosphere through groove 11. Thus the inertia cut-off valve 5 cuts off vacuum from the power unit of the brake of the vehicle at some predetermined degree of deceleration, and will relieve the vacuum existing in the above power unit if the deceleration exceeds some predetermined figure. The result is that any vehicle equipped with vacuum power brakes and the inertia cut-off valve 5 can be converted into a manual brake system automatically after some predetermined degree of deceleration is reached. The manually controlled wire 29 is operated by the control button 31, on the dash of the vehicle, and is capable of changing the tension in spring 28. As the tension in spring 28 is increased the deceleration necessary to operate the valve 5 is increased. Thus the operator of the vehicle can easily adjust the action of valve 5 to his own individual taste and to suit the existing road conditions. On slippery roads it is ordinarily desirable to decrease the tension in spring 28 so that the power unit will become inoperative at a smaller degree of deceleration.

The above description of the inertia cut-off valve 5 has been made without reference to the remaining parts of the system because this valve is capable of being used on any system using a vacuum or pressure power unit to apply the brakes of the vehicle, and it will perform the functions described in the manner outlined above regardless of the exact nature of the system with which it is associated. Obviously, the inertia cut-off valve 5 could be located in the conduit 39 of Figure 1 to perform the above functions.

Figure 2:
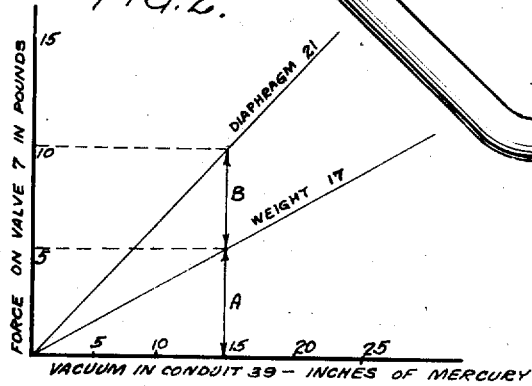
Figure 2 is a graph showing the relation of the forces produced on valve 7 of Fig. 1.

The inertia cut-off valve cooperates with the remaining elements of Figure 1. If the vehicle is in motion and the operator desires to stop, he first depresses the manually operated brake pedal 47. This applies the brakes of the vehicle causing it to begin decelerating. The arm 50 will have moved with the brake pedal 47 so that the weight 17 can swing forward as the vehicle begins to decelerate. This action moves the valve 7 to close off the atmosphere from passage 9 and opens passage 9 to vacuum in passage 3 since the valve 5 does not operate at ordinary light pressure on the brake pedal 47. This vacuum is transferred through the conduit 39 to the interior of the power cylinder 40, allowing atmospheric pressure acting on the outer face of piston 41 to move piston 41 to rotate the brake lever 43 in a counter-clockwise direction thereby assisting the operator of the vehicle in applying the brakes. However, as soon as the vacuum in passage 9 and the power cylinder 40 begins to build up, it is transferred to the diaphragm 21 allowing atmospheric pressure acting through the holes 27 in the diaphragm casing 20 to resist the motion of the weight 17. The increased deceleration caused by the vacuum in power cylinder 40, increases the inertia force of the weight 17 but the pull of diaphragm 27 is so related to the vacuum in passage 9 and power cylinder 40, that as this vacuum increases the pull of the diaphragm increases faster than the inertia force of the weight 17 caused by the deceleration of the vehicle, which in turn depends on the force exerted by the vacuum on piston 41 plus the force applied at pedal 47. These two forces act on valve 7 in opposite directions. Diaphragm 21 pushes valve 7 to the left and opens passage 9 and cylinder 40 to atmosphere to release the brake, while weight 17 pulls valve 7 to the right to close off atmosphere and open passage 9 and cylinder 40 to vacuum. Referring to Figure 2, when the total inertia force of weight 17 due both to the deceleration produced by vacuum in cylinder 40, and the manual operation of the pedal 47 (A and B respectively) become equal, or just greater than the force of diaphragm 21, the vehicle brake will be applied and held on. As Figure 2 shows, a total inertia force of 10 pounds (or slightly greater to overcome friction) will permit a vacuum of 15 inches of mercury to build up in cylinder 40 before the diaphragm 21 will close passage 9 from passage 3. Valve 7 is capable of closing off both atmosphere and vacuum from cylinder 40 at its intermediate position. Thus, the degree of vacuum at which the diaphragm 21 will overcome the inertia force of the weight 17 will depend on the pressure manually applied to the pedal 47, and as the pressure on the pedal 47 is increased, more vacuum will be available in passage 9 and power cylinder 40 to apply the brakes. Thus a brake operating means is provided that adds to the force of brake application in proportion to the force applied to the foot pedal by the operator. When the deceleration of the vehicle reaches some predetermined point, the inertia cut-out valve 5 operates in the manner previously described.

The operation of the system shown in Figure 1 can be further explained by the graph shown in Figure 2. In this graph two curves are shown.

The upper one shows the relation between the force in pounds exerted on valve 7 of Figure 1 by the diaphragm 21, and the vacuum existing in conduit 39 and the cylinder 40. The lower curve shows the relation of the force exerted on the valve 7 of Figure 1 by the inertia of the weight 17, and the vacuum in conduit 39 and cylinder 40. Obviously for any given vacuum in conduit 39 and cylinder 40 there is a corresponding force acting on the valve 7 by means of the diaphragm 21. Also for any given vacuum in the conduit 39 and cylinder 40, there is a corresponding force on the valve 7 produced by the weight 17 in response to the deceleration of the vehicle produced by the vacuum in cylinder 40. The curves and values given are for the purpose of illustration only, but it is obvious that by the proper relation of the leverages, the area of diaphragm 21, and the weight of weight 17 together with the tension of spring 34, that curves of the general character and relationship of Figure 2 can be obtained. It is obvious that the vacuum in cylinder 40 will never produce a deceleration great enough to cause weight 17 to overcome diaphragm 21 alone. Hence in order to have vacuum exist in cylinder 40 it is necessary for the operator of the vehicle to impart enough deceleration to the vehicle manually to cause the inertia force of weight 17 to overcome the diaphragm 21. This is done by pressure on the foot pedal 47. The greater the pressure applied on the pedal 47 by the operator, the greater the vacuum that will be admitted to the cylinder 40. Hence vacuum will assist the operator in applying the brakes of the vehicle in proportion to the pressure applied on the pedal 47. It can be seen from Figure 2 that if the operator supplies pressure on the pedal 47 sufficient to decelerate the vehicle until a force of B pounds is exerted on the valve 7, a vacuum will be built up in cylinder 40 sufficient to exert an inertia force of A pounds on the valve 7. Then the total inertia force of weight 17 on the valve 7 (A plus B) will just equal the force exerted on the valve 7 in the opposite direction by the diaphragm 21, at which time further vacuum will be closed off from cylinder 40 by valve 7. If the pressure applied on the pedal 47 is increased, it is apparent that more vacuum will be admitted to cylinder 40 until the pull on diaphragm 21 will again equal the inertia force of weight 17, and again if the pressure on pedal 47 is decreased, the pull on diaphragm 21 will be greater than the inertia force of weight 17, and air will be admitted to cylinder 40 until the inertia force of weight 17 just balances the pull of diaphragm 21. Thus vacuum in the cylinder 40 always exists in proportion to the pressure applied by the operator at the pedal 47, and the relative amount of work done by the operator and by vacuum will be represented by the ordinates B and A of Figure 2 respectively.

When the brake pedal 47 is partially released the change in deceleration of the vehicle allows the diaphragm to over-balance the inertia force of the weight 17 until the vacuum in passage 9 and power cylinder 40 decrease to the point that the weight 17 again swings forward to shut off atmosphere from passage 9 and hold vacuum in the power cylinder 40. When the brake pedal 47 is completely released the arm 50 forces the weight 17 backward to the position shown in Figure 1. This effects a rapid and complete release of the brakes when the operator's foot is removed from the brake pedal.

A further object of the arm 50 is to prevent the opening of the passage 9 to vacuum by the valve 7, while the brake pedal 47 is released. Without arm 50, weight 17 would respond to any deceleration of the vehicle and would apply the brakes regardless of the position of the brake pedal 47. Frequently an unskilled operator will, while shifting the gears of the vehicle, allow the clutch to engage while the transmission is in low or second gear, and motor speed is much below the corresponding speed of the vehicle. This results in the deceleration of the vehicle and it would be undesirable to have the brakes applied at such a time.

Tension spring 34 acts to restrict the forward motion of weight 17 and is adjustable in its tension by the manually controlled wire 35 and the control button 36 mounted on the dash 30. As the tension of spring 34 is increased, the degree of deceleration of the vehicle required to swing the weight 17 forward to open passage 9 to vacuum in passage 3 increases. Hence, the operator of the vehicle can, by use of the control button 36, increase or decrease the amount of deceleration necessary to impart to the vehicle, by the use of foot pedal 47, to cause the valve 7 to admit vacuum to the power cylinder 40. This increase of tension in spring 34 will require that the operator furnish a greater part of the energy required to apply the brakes through the entire range of brake application, since more pressure on brake pedal 47 will always be required to increase the inertia force of weight 17 to offset the additional tension of spring 34. The linkage 24 can be attached to the weight at various points, as at 26, by changing its length with turn-buckle 25. This adjustment can be used to produce results similar to the change in tension of spring 34. If the point of connection of linkage 24 to the arm of weight 17 is moved away from the bearing 18, the effect of vacuum in passage 9 to close passage 3 from passage 9 by means of valve 7 will be increased and hence, the inertia force of the weight 17 necessary to open passage 9 to vacuum will be increased. This can be done by greater pressure on foot pedal 47. When the linkage 24 is moved toward bearing 18, the reverse is true.

However, the effect of the adjustment of linkage 24 is different from that of spring 34, since the diaphragm 21 is not operative to resist the motion of weight 17 until vacuum exists in passage 9 and power cylinder 40. Hence, this adjustment will allow greater assistance in applying the brakes of the vehicle at the initial brake application than the spring 34. This is apparent since the vehicle must be decelerated enough to allow the inertia force of weight 17 to overcome spring 34 before vacuum can assist the operator in applying the brakes.

Obviously, the wire 35 of Figure 1 could be attached to the linkage 24 and a slot formed in weight 17 in place of the holes, as holes 26, so that the linkage 24 could be adjusted by control button 36.

While the invention has been described with some detail, it is to be understood that the description is for the purpose of illustration only and is not to be construed as definitive of the limits of the inventive idea. The right is reserved to make such changes in the details of construction and arrangement of parts as will fall within purview of the following claims.

What I claim is:

1. In a system of the class described a vehicle having an engine with an intake manifold and a brake pedal, or the like, with brake linkage operative by said pedal, a pressure responsive member operatively connected to said linkage, means providing a passage from the said intake manifold to said member, a control means with connections for admitting vacuum to and releasing it from said member variably as said vehicle is decelerated to varying degrees by the varying application of said brake pedal.

2. In a system of the class described, a vehicle having an engine with an intake manifold and a brake pedal, or the like, with brake linkage operative by said pedal, a pressure responsive member operatively connected to said linkage, means providing a passage from said intake manifold to said member, an inertia controlled valve in said passage, said valve responding to the deceleration of said vehicle upon the actuation of said brake pedal to admit manifold vacuum to said member whereby said member cooperates with said pedal to apply the brakes of said vehicle and operates on the release of said brake pedal to close said member from vacuum and admit atmosphere to said member whereby the brakes of said vehicle are released.

3. In a system of the class described, a vehicle having an engine with an intake manifold and a brake pedal, or the like, with brake linkage operative by said pedal, a pressure responsive member operatively connected to said linkage, means providing a passage from said intake manifold to said member, a valve in said passage, said valve being operative by the deceleration of said vehicle upon the actuation of said brake pedal to admit manifold vacuum to said member whereby said member cooperates with said brake pedal and operates on the release of said brake pedal to admit atmosphere to said member.

4. In a system of the class described, a vehicle having an engine with an intake manifold and a brake pedal, or the like, with brake linkage operative by said pedal, a pressure responsive member operatively connected to said linkage, means providing a passage from said intake manifold to said member, means responsive to the deceleration of said vehicle upon the actuation of said brake pedal to admit vacuum to said member whereby said member cooperates with said pedal and relieves vacuum from said member when said pedal is released, and means operative to adjust the degree of deceleration at which aforesaid means responsive to the deceleration of said vehicle operates.

5. The combination with the intake manifold of the motor of an automotive vehicle, the brake pedal and brake linkage of said vehicle, of a pressure responsive member operatively connected to said linkage, means providing a passage from said intake manifold to said member, a valve in said passage, said valve being operative by the deceleration of said vehicle upon the operation of said brake pedal to admit manifold vacuum to said member whereby said member cooperates with said pedal, means responsive to the vacuum admitted to said member to close said valve whereby vacuum is closed from said member and said member is exposed to atmospheric pressure as said pedal is released.

6. The combination with the intake manifold of the motor of an automotive vehicle, the brake pedal and brake linkage of said vehicle, of a pressure responsive member operatively connected to said linkage, means providing a passage from said intake manifold to said member, a valve in said passage, means whereby said valve is operative by the deceleration of said vehicle upon the operation of said brake pedal to admit manifold vacuum to said member whereby said member co-operates with said pedal, and relieve vacuum from said member as said pedal is released, resilient means operative to oppose the action on said valve of aforesaid means operative by the deceleration of said vehicle.

7. The combination with the intake manifold of the motor of an automotive vehicle, the brake pedal and brake linkage of said vehicle, of a pressure responsive member operatively connected to said linkage, means providing a passage from said intake manifold to said member, a valve in said passage, said valve being operative by the deceleration of said vehicle upon the operation of said brake pedal to admit manifold vacuum to said member whereby said member cooperates with said pedal, means responsive to the vacuum admitted to said member to close said valve whereby vacuum is closed from said member and air is admitted to said member, and means for adjusting the effects of said vacuum on the operation of said valve.

8. The combination with the intake manifold of the motor of an automotive vehicle, the brake pedal and brake linkage of said vehicle, of a pressure responsive member operatively connected to said linkage, means providing a passage from said intake manifold to said member, a valve in said passage, said valve being operative by the deceleration of said vehicle upon the operation of said brake pedal to admit manifold vacuum to said member whereby said member cooperates with said pedal, and relieve vacuum from said member as said pedal is released, resilient means operative to oppose the motion of said valve to admit vacuum to said member, means adjusting the effect of said resilient means on said valve whereby the degree of deceleration at which said valve operates can be controlled.

9. The combination with the intake manifold of the motor of an automotive vehicle, the brake pedal and brake linkage of said vehicle, of a pressure responsive member operatively connected to said linkage, means providing a passage from said intake manifold to said member, a valve in said passage, said valve being operative by the deceleration of said vehicle upon the operation of said brake pedal to admit manifold vacuum to said member whereby said member cooperates with said pedal, means associated with the said brake linkage whereby the release of said brake pedal acts to close said valve to shut off vacuum from said member and expose said member to atmosphere.

10. The combination with the intake manifold of the motor of an automotive vehicle, the brake pedal and brake linkage of said vehicle, of a pressure responsive member operatively connected to said linkage, means providing a passage from said intake manifold to said member, a valve in said passage, means whereby said valve is operative by the deceleration of said vehicle upon the operation of said brake pedal to admit manifold vacuum to said member in increasing amounts as said brake pedal effects a greater deceleration of said vehicle whereby said member cooperates with said pedal, means responsive to the vacuum admitted to said member to close said valve at an increasing degree of vacuum as said vehicle is decelerated to a greater degree, and operative to expose said member to atmospheric pressure as said pedal is released.

11. The combination with the intake manifold of the motor of an automotive vehicle, the brake pedal and brake linkage of said vehicle, of a pressure responsive member operatively connected to said linkage, of means providing a passage from said intake manifold to said member, a valve in said passage, said valve being operative by the deceleration of said vehicle upon the operation of said brake pedal to close said valve at a predetermined degree of deceleration of said vehicle whereby vacuum is closed from said pressure responsive member, a second valve in said passage, said second valve being operative by the deceleration of said vehicle upon the operation of said brake pedal to admit manifold vacuum to said member whereby said member cooperates with said pedal, means responsive to the vacuum admitted to said member to close said valve whereby vacuum is closed from said member and said member is exposed to atmospheric pressure as said pedal is released.

12. In a system of the class described, in combination with a source of fluid pressure differentials, mechanism adapted to be operated by said pressure differentials for a work performing movement, means manually operable at will to assist said mechanism and connections controlled thereby for controlling the communications of said fluid pressure with said mechanism variably, said connections comprising means for withdrawing fluid from said work performing mechanism to create a differential in pressure which varies directly as the force supplied to said means manually operable at will and relieving the fluid pressure differential from said work performing mechanism as the force supplied to said means manually operable at will is decreased.

13. In a vehicle braking system, in combination with means for the manual operation of said system, a source of fluid pressure differentials, a pressure differential responsive member adapted to operate said system, means providing a passage between said member and said fluid pressure source, means whereby fluid is withdrawn from said member to create a differential in pressure in increasing amounts which varies directly as the force applied to said means for the manual operation of said system, and the fluid pressure differentials operating said member is reduced as the force applied to said means for the manual operation of said system is reduced.

14. In a system of a class described a vehicle, in combination with a source of fluid pressure differentials, a pressure responsive member adapted to be operated by said pressure differentials for work performing movement, means operable at will and connections controlled thereby for controlling the communication of said fluid pressure differentials with said member variably, said connections comprising means for withdrawing fluid from said member in proportion to the deceleration of the vehicle resulting from the actuation of said means operable at will, and relieving the fluid pressure from said member as said means operable at will is released.

15. In a vehicle braking system, in combination with means for the manual operation of said system, a source of fluid pressure differentials, a pressure differential responsive member adapted to operate said system, means providing a passage between said fluid pressure differential source, a control means operative to withdraw fluid from said member in increasing amounts as the vehicle is decelerated to a greater degree by the operation of said means for the manual operation of said system, said control means being further provided with connections for reducing the fluid pressure differential operating said member as said means for the manual operation of said system is released.

16. In a system of the class described, a vehicle having an engine with an intake manifold and a brake pedal, or the like, with brake linkage operative by said pedal, a pressure responsive member operatively connected to said linkage, means providing a passage from said intake manifold to said member, a valve in said passage controlling communication between said member and the intake manifold of the engine, means operative on said valve upon the deceleration of said vehicle by the actuation of said pedal to admit manifold vacuum to said member, whereby said member co-operates with said pedal, and means responsive to vacuum admitted to said member and operative to urge said valve to close said passage from vacuum and expose said member to atmosphere.

RALPH S. WHITTINGTON.

---

CERTIFICATE OF CORRECTION.

Patent No. 2,087,367.     July 20, 1937.

RALPH S. WHITTINGTON.

It is hereby certified that error appears in the printed specification of the above numbered patent requiring correction as follows: Page 1, second column, line 6, for the word "brakes" read brake; page 2, second column, line 27, for "beings" read begins; page 5, first column, lines 39 and 40, claim 13, strike out "fluid pressure"; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.

said linkage, of means providing a passage from said intake manifold to said member, a valve in said passage, said valve being operative by the deceleration of said vehicle upon the operation of said brake pedal to close said valve at a predetermined degree of deceleration of said vehicle whereby vacuum is closed from said pressure responsive member, a second valve in said passage, said second valve being operative by the deceleration of said vehicle upon the operation of said brake pedal to admit manifold vacuum to said member whereby said member cooperates with said pedal, means responsive to the vacuum admitted to said member to close said valve whereby vacuum is closed from said member and said member is exposed to atmospheric pressure as said pedal is released.

12. In a system of the class described, in combination with a source of fluid pressure differentials, mechanism adapted to be operated by said pressure differentials for a work performing movement, means manually operable at will to assist said mechanism and connections controlled thereby for controlling the communications of said fluid pressure with said mechanism variably, said connections comprising means for withdrawing fluid from said work performing mechanism to create a differential in pressure which varies directly as the force supplied to said means manually operable at will and relieving the fluid pressure differential from said work performing mechanism as the force supplied to said means manually operable at will is decreased.

13. In a vehicle braking system, in combination with means for the manual operation of said system, a source of fluid pressure differentials, a pressure differential responsive member adapted to operate said system, means providing a passage between said member and said fluid pressure source, means whereby fluid is withdrawn from said member to create a differential in pressure in increasing amounts which varies directly as the force applied to said means for the manual operation of said system, and the fluid pressure differentials operating said member is reduced as the force applied to said means for the manual operation of said system is reduced.

14. In a system of a class described a vehicle, in combination with a source of fluid pressure differentials, a pressure responsive member adapted to be operated by said pressure differentials for work performing movement, means operable at will and connections controlled thereby for controlling the communication of said fluid pressure differentials with said member variably, said connections comprising means for withdrawing fluid from said member in proportion to the deceleration of the vehicle resulting from the actuation of said means operable at will, and relieving the fluid pressure from said member as said means operable at will is released.

15. In a vehicle braking system, in combination with means for the manual operation of said system, a source of fluid pressure differentials, a pressure differential responsive member adapted to operate said system, means providing a passage between said fluid pressure differential source, a control means operative to withdraw fluid from said member in increasing amounts as the vehicle is decelerated to a greater degree by the operation of said means for the manual operation of said system, said control means being further provided with connections for reducing the fluid pressure differential operating said member as said means for the manual operation of said system is released.

16. In a system of the class described, a vehicle having an engine with an intake manifold and a brake pedal, or the like, with brake linkage operative by said pedal, a pressure responsive member operatively connected to said linkage, means providing a passage from said intake manifold to said member, a valve in said passage controlling communication between said member and the intake manifold of the engine, means operative on said valve upon the deceleration of said vehicle by the actuation of said pedal to admit manifold vacuum to said member, whereby said member co-operates with said pedal, and means responsive to vacuum admitted to said member and operative to urge said valve to close said passage from vacuum and expose said member to atmosphere.

RALPH S. WHITTINGTON.

---

CERTIFICATE OF CORRECTION.

Patent No. 2,087,367.                                July 20, 1937.

RALPH S. WHITTINGTON.

It is hereby certified that error appears in the printed specification of the above numbered patent requiring correction as follows: Page 1, second column, line 6, for the word "brakes" read brake; page 2, second column, line 27, for "beings" read begins; page 5, first column, lines 39 and 40, claim 13, strike out "fluid pressure"; and that the said Letters Patent should be read with these corrections therein that the same may conform to the record of the case in the Patent Office.

Signed and sealed this 22nd day of February, A. D. 1938.

(Seal)                                                               Henry Van Arsdale,
                                                                            Acting Commissioner of Patents.

CERTIFICATE OF CORRECTION.

Patent No. 2,087,367. July 20, 1937.

RALPH S. WHITTINGTON.

It is hereby certified that error appears in the printed specificatio of the above numbered patent requiring correction as follows: Page 1, secon column, line 6, for the word "brakes" read brake; page 2, second colum line 27, for "beings" read begins; page 5, first column, lines 39 and 4 claim 13, strike out "fluid pressure"; and that the said Letters Patent shou be read with these corrections therein that the same may conform to the recc of the case in the Patent Office.

Signed and sealed this 22nd day of February, A. D. 1938.

Henry Van Arsdale,
Acting Commissioner of Patent:

(Seal)